(12) United States Patent
Bele et al.

(10) Patent No.: US 6,264,834 B1
(45) Date of Patent: *Jul. 24, 2001

(54) SEWAGE TREATMENT PLANT FOR THICKENING A SOLID-LIQUID SUSPENSION

(75) Inventors: Patrick Bele, Saint Germain en Laye; Didier Perrin, Cormeilles en Parisis; Jean-Pierre Virecoulon, Rueil Malmaison, all of (FR)

(73) Assignee: Degremont, Rueil Malmaison (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,411
(22) PCT Filed: Sep. 26, 1997
(86) PCT No.: PCT/FR97/01700
   § 371 Date: Jun. 11, 1999
   § 102(e) Date: Jun. 11, 1999
(87) PCT Pub. No.: WO98/14261
   PCT Pub. Date: Apr. 9, 1998

(30) Foreign Application Priority Data

Oct. 3, 1996 (FR) .................................................. 96 12072

(51) Int. Cl.[7] ............................. B01D 29/03; C02F 11/12
(52) U.S. Cl. ...................... 210/159; 210/413; 210/433.1; 210/499
(58) Field of Search .................................... 210/159, 162, 210/413, 433.1, 499

(56) References Cited

U.S. PATENT DOCUMENTS

| | | | |
|---|---|---|---|
| 3,332,556 | * 7/1967 | Hirs | 210/413 |
| 3,865,727 | * 2/1975 | Broling et al. | 210/162 |
| 4,247,397 | * 1/1981 | Dobosi | 210/162 |
| 4,277,339 | * 7/1981 | Quin | 210/413 |
| 4,666,602 | * 5/1987 | Hartzeh | 210/413 |
| 5,795,467 | * 8/1998 | Schloss et al. | 210/162 |

FOREIGN PATENT DOCUMENTS

3920196 * 1/1991 (DE).
2581559 * 11/1986 (FR).

OTHER PUBLICATIONS

Translation of DE 3920196.*

* cited by examiner

Primary Examiner—Christopher Upton
(74) Attorney, Agent, or Firm—Connolly Bove Lodge & Hutz

(57) ABSTRACT

Sewage treatment intended for separating solids and liquids under gravity, particularly for sludge from sewage works, comprising a flat and stationary thickening or drainage grating onto which the sludge is continuously conveyed, this sludge being constantly scraped by a scraping system with flexible blades. The grating is made up of a number of strips, the spacings of which vary along their lengths, the characteristics of the spacings between the strips of the grating and their variations being defined on the basis of the nature of the solid-liquid suspension to the thickened, of its concentration, and of the feed-rate of the plant.

6 Claims, 4 Drawing Sheets

SEWAGE TREATMENT PLANT FOR THICKENING A SOLID-LIQUID SUSPENSION

FIELD OF THE INVENTION

The present invention relates to improvements made to plant for thickening a sold-liquid suspension by drainage.

BACKGROUND OF THE INVENTION

FR-A-2,581,559 describes a treatment plant for thickening a solid-liquid suspension, which operates continuously, placed at the delivery side of the sludge feed pump. This plant comprises a flat and stationary drainage or thickening grating, onto which the sludge that is to be thickened is continuously delivered, this sludge being constantly scraped by a scraping system with flexible blades. The sludge concentration increases gradually as it progresses along the grating zone.

This known plant, intended more specifically for thickening sludge from sewage works can be used either for final thickening, for example for an agricultural use of the sludge, or for pre-thickening, upstream of a dewatering plant.

Although, in general, this type of plant is satisfactory as it allows a broad range of sludge concentrations to be thickened, it does, however, have the drawback of operating with relatively low hydraulic flow rates, in particular in the case of low-concentration solid-liquid suspensions, that is to say ones which have concentrations of below 5 g/l. It is, incidentally, for this very reason that this known thickening plant is generally fed from a construction or an intermediate device whose function is to raise the concentration of the solid-liquid suspension fed to the plant.

Furthermore, this known plant is equipped with a grating made up of a number of large cross-section strips, the gaps percentage of which is of the order of 25%. This characteristic contributes to the hydraulic limitations of this type of plant.

BRIEF SUMMARY OF THE INVETNION

Starting out from this state of the art, the present invention proposes to make improvements with a view, in particular, to significantly increasing the permissible hydraulic flow rates and to do so in particular for low-concentration solid-liquid suspensions.

The invention also makes it possible to do away with any intermediate construction or device intended, in plants according to the state of the prior art, to raise the concentration of the solid-liquid suspension fed to the plant.

Likewise, the improved plant according to the invention makes it possible to get around variations in the quality and concentration of solid-liquid suspensions generated by the intermediate constructions and devices. The operating parameters for the plant (supply of reagents, washing sequences, etc.) can be optimized given that it is fed with a solid-liquid suspension of stable concentration, for example a water-sludge suspension from an aeration tank.

In consequence, the present invention relates to a plant intended for separating solids and liquids under gravity, particularly for sludge from sewage works, comprising a flat and stationary thickening or drainage grating onto which the sludge is continuously conveyed, this sludge being constantly scraped by a scraping system with flexible blades. The grating is made up of a number of strips, the spacings of which vary along their lengths, the characteristics of the spacings between the strips of the grating and their variations being defined on the basis of the nature of the solid-liquid suspension to be thickened, of its concentration, of the feed rate of the plant.

According to the present invention, the variation in spacing between the strips of the grating may be continuous or discontinuous between the inlet and the outlet of the plant.

According to another feature of the invention, the thickening grating may be inclined, with an upwards slope between the inlet and the outlet of the plant, it being possible for this slope to be between 1 and 40°, preferably between 2 and 15°.

According to the present invention, it is also possible to use a grating in which the strips have a small cross section so as to further and significantly increase the gaps percentage. This feature, combined with the feature relating to the choice of the size of the spacing between the strips of the drainage grating makes it possible, according to the invention, to obtain a drainage grating which has a gaps percentage in excess of 30% and which may be as high as 50%.

Other features and advantages of the present invention will emerge from the description given hereafter with reference to the appended drawings, which illustrate some entirely non-limiting embodiments thereof.

As far as a general description of the thickening plant to which the present invention relates is concerned, reference may be made to the description of Patent FR-A-2,581,559, to which the invention constitutes an improvement.

DETAILED DESCRIPTION

Figure 1A:
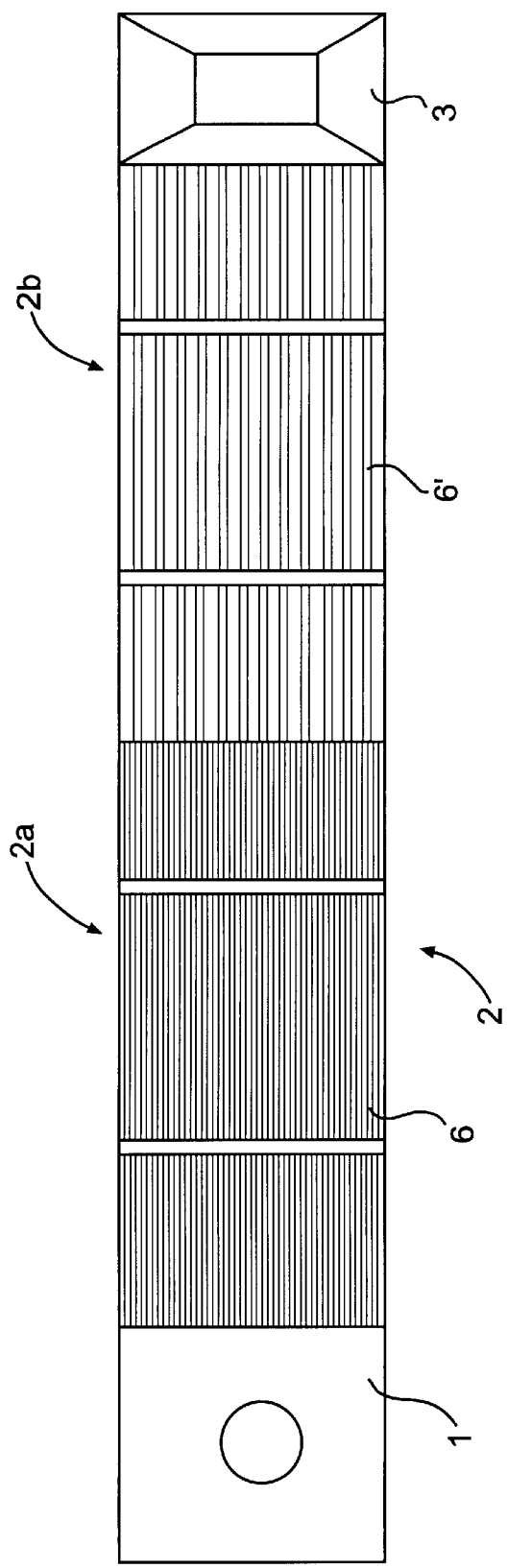
FIG. 1A is a plan view of an improved plant according to a first embodiment of the invention.
Figure 3:
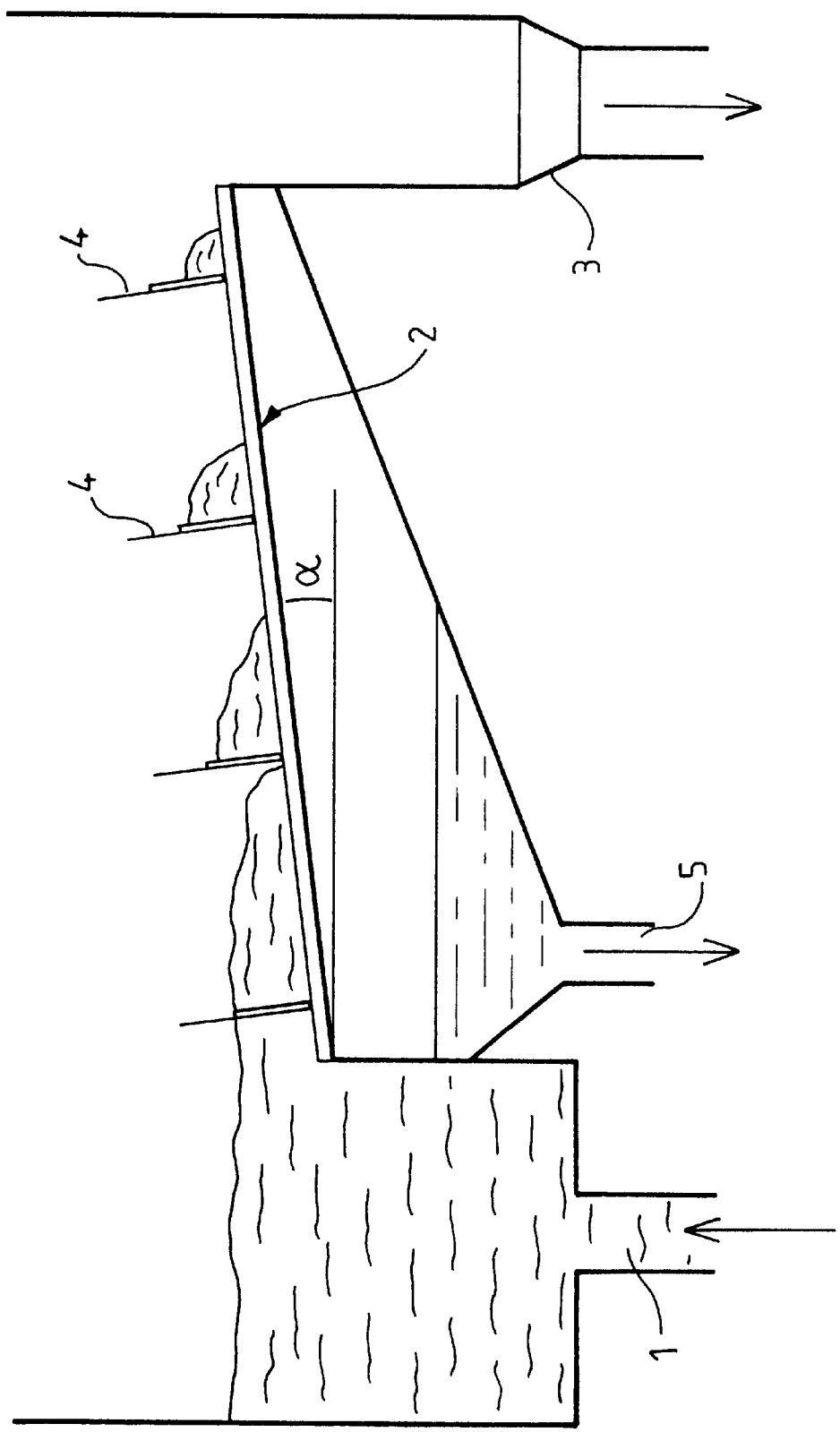
FIG. 3 is a diagrammatic view of the plant according to the invention, in longitudinal section.

Referring first of all to FIGS. 1A and 3, these diagrammatically depict a thickening plant comprising a sludge inlet 1, a flat and stationary drainage or thickening grating 2 on which the sludge is continuously spread out, this sludge being constantly scraped by flexible blades 4, the thickened sludge being collected at 3 and the drained water being removed at 5. In this embodiment, the spacings between the strips 6 that constitute the drainage grating 2 increase from the inlet 1 towards the outlet 3 of the plant. To this end, the grating 2 comprises a first run 2a consisting of strips 6 which are closely spaced and a second run 2b consisting of strips 6' which are more widely spaced. There is thus a discontinuous variation in the spacing of the strips of the grating 2 between the inlet and the outlet of the plant.

Figure 1B:
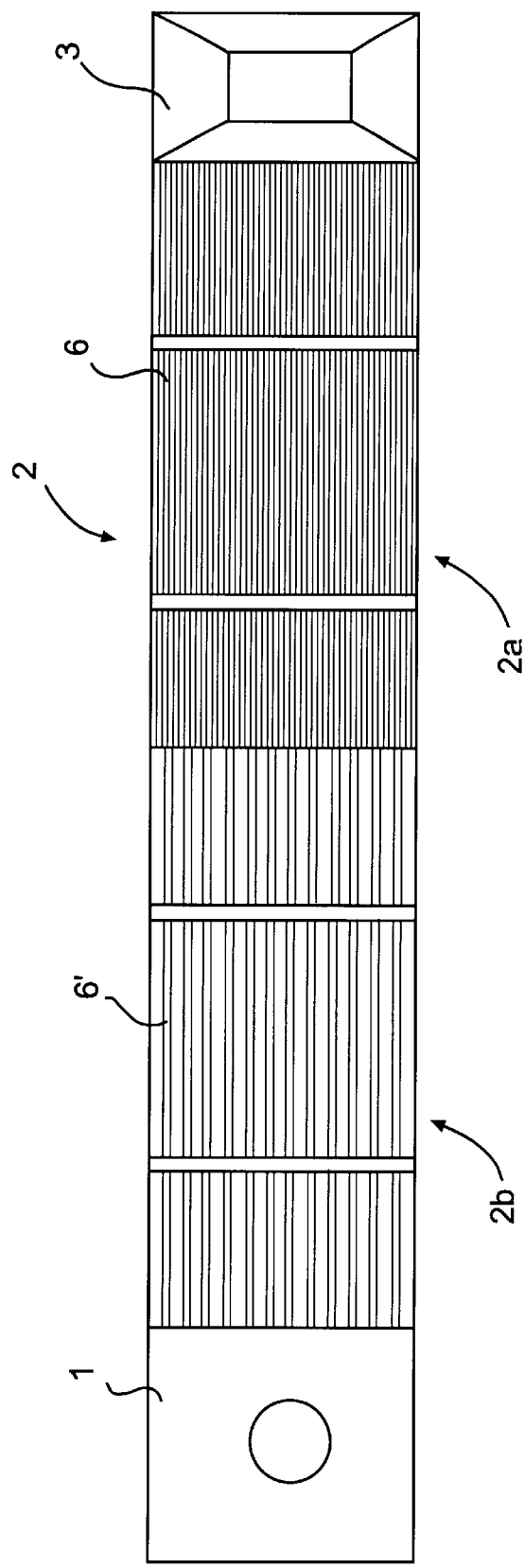
FIG. 1B is a plan view of an improved plant according to a second embodiment of the invention.

Of course, it is also possible to contrive for the spacing of the strips to decrease from the inlet 1 towards the outlet 3 of the plant (FIG. 1B), it being possible for this variation to be continuous or discontinuous, gradual or in stages.

Figure 2:
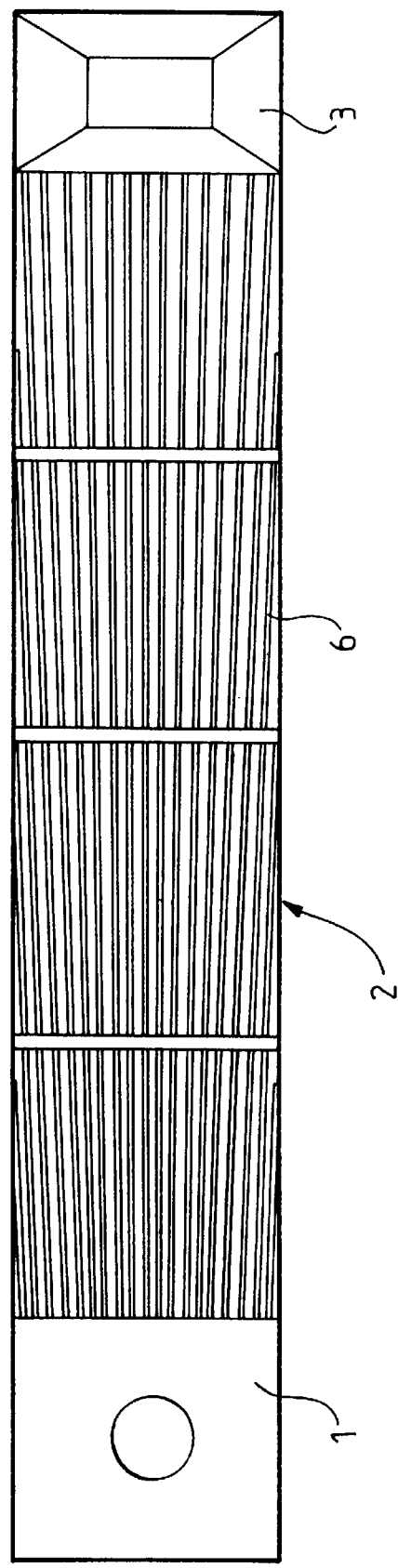
FIG. 2 is a view similar to FIG. 1 of another embodiment of the improved plant according to the invention.

In the embodiment illustrated in FIG. 2, the drainage grating 2 is produced in such a way that the spacing between the strips 6 that make up the drainage grating 2 increases continuously between the inlet 1 and the outlet 3 of the plant.

As specified above, the characteristics of the spacings between the strips of the drainage grating 2 and their variations are defined on the basis of the nature of the solid-liquid suspension to be thickened, of its concentration, of the feed rate of the plant, and also on the basis of pilot tests.

Referring to FIG. 3, it can be seen that according to the present invention, the drainage grating 2 is inclined to the horizontal at an angle α, the slope of the grating being upwards between the inlet 1 and the outlet 3 of the plant, and the angle α being between 1 and 40° and preferably between 2 and 15°. This feature makes it possible to increase the length of time for which the solid-liquid suspension is held on the drainage grating 2.

A result of comparative tests between a plant according to the prior art mentioned above and the improved plant according to the invention are given below by way of non-limiting example. These tests which were performed on a pilot plant clearly demonstrate the performance yielded by the invention.

A) Characteristics of the solid-liquid suspension:
  urban wastewater extended aeration sludge
  concentration: 3 to 5 g/l
  Mohlman number: 150
B) Characteristics of the grating according to the prior art (FR-A-2,581,559)
  grating width: 500 mm
  grating length: 1500 mm
  slope: 0 degrees
  spacing: 600 microns
  strip width: 1.8 mm
C) Characteristics of the improved grating according to the invention
  grating width 500 mm
  grating length 1500 mm
  slope: 4 degrees
  spacings: 350 microns over 750 mm, then 600 microns over 750 mm
  strip width: 1 mm
D) Performance
  grating according to the prior art:
  hydraulic flow rate supplying the grating: 4 to 6 m$^3$/h
  dryness on leaving the grating: 6%
  improved grating according to the invention:
  hydraulic flow rate feeding the grating: 15 to 22 m$^3$/h
  dryness on leaving the grating: 6%

As can be seen, the improvements that are the subject of the invention make it possible at minimum to triple the mass flow rate of sludge treated with this type of equipment.

It remains clearly understood that the present invention is not restricted to the embodiments described and/or depicted here but that it encompasses all alternative forms thereof which fall within the scope of the appended claims.

What is claimed is:

1. A sewage treatment plant for separating solids and liquids from sewage sludge comprising:
   a source of sewage sludge
   a flat, stationary grating onto which the sludge is continuously conveyed, the grating having a plurality of strips that vary in spacing along the length of the grating, and wherein a ratio of spacing between the strips to their cross section is between 30% and 50%;
   a plurality of flexible blades movably mounted over the grating for scraping all of the sludge continuously therealong for pushing draining sludge from an inlet end of the grating to an outlet end thereof;
   a trough located below the grating and inclined downwardly from the outlet end to the inlet end;
   a drain located at a bottom end of the trough for draining liquid that has separated from the thickening sludge, and fallen into the trough, as the sludge is scrapped along the grating; and
   an outlet located at the outlet end of the grating for removing the thickened sludge from the grating.

2. The sewage treatment plant for separating solids and liquids from sewage sludge according to claim 1 wherein the variation in spacing between the strips of the grating is continuous between the inlet end and an outlet end of the grating.

3. The sewage treatment plant for separating solids and liquids from sewage sludge according to claim 1 wherein the variation in spacing between the strips of the grating is discontinuous between the inlet end and an outlet end of the grating.

4. The sewage treatment plant for separating solids and liquids from sewage sludge according to claim 1 wherein the variation in spacing between the strips of the grating occurs in at least two sections, and wherein the spacing from section to section decreases in a direction from the inlet end to the outlet end of the grating.

5. The sewage treatment plant for separating solids and liquids from sewage sludge according to claim 1 wherein the variation in spacing between the strips of the grating occurs in at least two sections, and wherein the spacing from section to section increases in a direction from the inlet end to the outlet end of the grating.

6. The sewage treatment plant for separating solids and liquids from sewage sludge according to claim 1 wherein the grating is inclined, from the inlet end to the outlet end, with a slope between 1 and 40 degrees for increasing the length of time for which the solid-liquid suspension is held on the grating.

* * * * *